UNITED STATES PATENT OFFICE.

NATHANIEL JENKINS, OF BOSTON, MASSACHUSETTS.

IMPROVEMENT IN THE MANUFACTURE OF ELASTIC PACKING.

Specification forming part of Letters Patent No. 54,554, dated May 8, 1866.

*To all whom it may concern:*

Be it known that I, NATHANIEL JENKINS, of Boston, in the county of Suffolk and State of Massachusetts, have invented a new and useful Elastic Packing for Joints and Valves Exposed to Destructive Fluids; and I do hereby declare that the following full, clear, and exact description of the construction and operation of the same is sufficient to enable others skilled in the art to make and use the same without other invention or discovery.

An elastic packing of indestructible properties to a valve-joint or aperture through which a destructive fluid is to pass, such as steam of any kind, hot water, kerosene or other coal-oil, hot or cold, has been unattainable till recently; but after experiments of more than a year I claim to have discovered a tight indestructible elastic packing for these purposes. To make this is I combine, in various proportions, the following ingredients: pure rubber, from twenty to twenty-five per cent.; pure gum-shellac, from ten to twenty per cent.; pure paris-white, from twenty to thirty per cent.; pure French chalk, from fifteen to twenty-five per cent.; pure litharge, from eleven to eighteen per cent.; pure lamp-black, from two to three per cent.; pure sulphur, from one to two per cent. I increase the quantity of rubber when the fluid to be resisted is less penetrating, and increase the quantity of paris-white, French chalk, litharge, and shellac when it is more penetrating.

One hundred parts of the above articles mingled within the percentages given will be comparatively indestructible in the presence of coal-oil, steam, or hot water, and will preserve their elasticity and texture for a long time unchanged.

The following table of proportions now in use with coal-oil, steam, and hot water, respectively, have given favorable results, and I am inclined to consider them the best attainable for their respective purposes.

| Articles. | Percentage in which to be mingled for— | | |
|---|---|---|---|
| | Coal-oil. | Steam. | Hot water. |
| Rubber | $21\frac{1}{4}$ | $24\frac{1}{8}$ | $24\frac{1}{6}$ |
| Shellac | $16\frac{1}{4}$ | 11 | 15 |
| Paris-white | $26\frac{1}{2}$ | $21\frac{3}{8}$ | $20\frac{1}{6}$ |
| French chalk | 16 | $24\frac{1}{3}$ | $24\frac{1}{6}$ |
| Litharge | $15\frac{1}{2}$ | $13\frac{1}{2}$ | $12\frac{1}{6}$ |
| Lamp-black | $3\frac{1}{4}$ | $2\frac{7}{12}$ | $2\frac{0}{6}$ |
| Sulphur | 1 | $2\frac{7}{12}$ | $2\frac{1}{6}$ |
| Parts | 100 | 100 | 100 |

I do not, however, confine my invention to these exact proportions, but consider it most accurately stated by the limitations given before.

The ingredients, other than the rubber, are to be finely powdered and intimately mixed together. They are then to be spread on the surface of the rubber and rolled into it between cold rollers until they are thoroughly incorporated with the substance of the rubber. The mass is then to be molded in iron molds of proper shape and subjected to a steam-pressure of from sixty to seventy-five pounds to the inch, which gives the heat necessary to vulcanize the same. The pressure is varied within the above limits, according to the hardness desired. The pressure and heat should continue from twenty to forty-five minutes.

What I claim as my invention, and desire to secure by Letters Patent is—

The composition above set forth and its process of manufacture, substantially as and for the purposes described, disclaiming the vulcanizing of rubber by means of heat and the method of mixing the ingredients otherwise than as applicable to this composition.

NATHL. JENKINS.

Witnesses:
THOS. WM. CLARKE,
GEO. R. CLARKE.